E. A. GREEN.
NUT AND RETAINER.
APPLICATION FILED JULY 5, 1912.
1,166,203.
Patented Dec. 28, 1915.
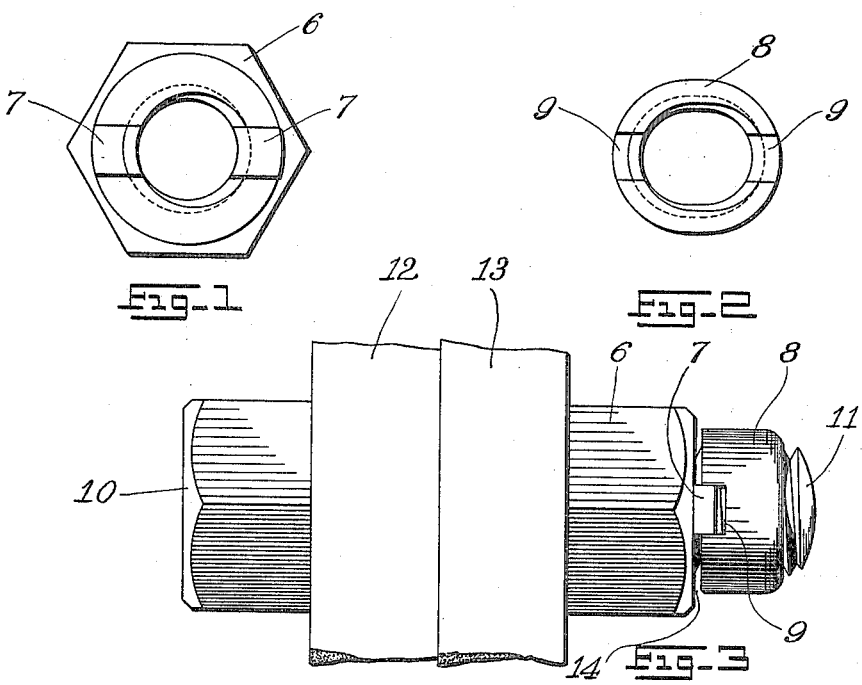
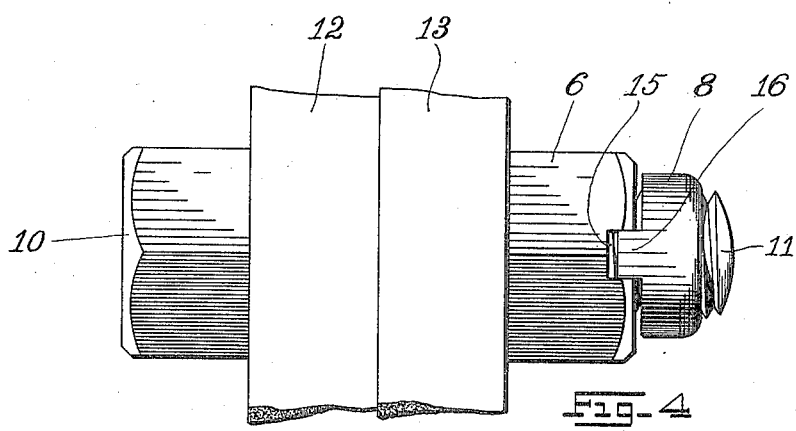
WITNESSES:
INVENTOR
Edward A. Green.
BY
ATTORNEY

UNITED STATES PATENT OFFICE.

EDWARD A. GREEN, OF CHICAGO, ILLINOIS.

NUT AND RETAINER.

1,166,203.  Specification of Letters Patent.  Patented Dec. 28, 1915.

Application filed July 5, 1912. Serial No. 707,891.

*To all whom it may concern:*

Be it known that I, EDWARD A. GREEN, a citizen of the United States, residing at Chicago, in the county of Cook and State of Illinois, have invented certain new and useful Improvements in Nuts and Retainers Used in Connection with Threaded Bolts, of which the following is a specification.

This invention relates to a nut and its retainer, the latter being designed to be held in a stationary position by its friction with the threads and mechanically locked for rotation with the nut when applied to the bolt, but so constructed that the nut and the retainer can never come into bearing engagement with each other in a direction longitudinal of the bolt shaft throughout their travel on the bolt.

The principal object of the invention is to provide an improved, simple, inexpensive and efficient device of the class described, which will require no special preparation or tools to apply, the application, adjustment and removal being performed with any usual or well-known kind of wrench and with little more labor than is required with an ordinary nut.

For the attainment of these ends and the accomplishment of other new and useful objects, as will appear, the invention consists in the features of novelty in the construction, combination and arrangement of the several parts, generally shown in the accompanying drawing and described in the specification, but more particularly pointed out in the appended claims.

In the drawing Figure 1 is a view of the top or crown of a nut constructed in accordance with the principles of my invention; Fig. 2 is a view of the adjacent face of a retainer which is applied to the nut, showing also the radial distortion of the retainer at opposite points in its circumference, the distortion being considerably magnified for clearness; Fig. 3 is a side view of a bolt, showing the nut and its retainer when applied thereto; Fig. 4 is a view similar to Fig. 3, showing a modified form of the nut and its retainer.

In the present exemplification of the invention, the nut need not differ in general form or dimensions from the standard nut, but has, as an additional feature, one or more (preferably two) lugs projecting outwardly from its crown face, which are designed to engage corresponding recesses in the adjacent face of its retainer. The retainer is a tubular member internally threaded to correspond with the bolt and has in one of its faces one or more slots designed to engage the corresponding lugs on the adjacent face of its nut. After the retainer is formed, it is slightly distorted at one or more points in its circumference (preferably at two opposite points disposed at angles of 90 degrees or substantially a quarter of the circumference from the recesses). This distortion from a true circle causes the threaded surfaces to bind at these points when applied to the bolts with sufficient friction to enable the retainer to perform its only function, viz: that of holding its position on the bolt shaft and preventing in the presence of vibration the tendency of the nut to rotate on the bolt shaft. The retainer, due to its material and more particularly to its tubular cross section, possesses resilience which enables it to compensate for the wear in the threads. The device may be removed and re-applied many times without losing its effectiveness; the effectiveness may be increased at any time by a light stroke of a hammer or the like. The nut itself forms the wrench for the retainer, therefore, no extra tools or operations are required to apply, adjust or remove the device.

Referring now more particularly to the drawing, a nut shaped member 6 of any desired or suitable number of parallel faces is provided with projections 7, preferably two in number and disposed at diametrically opposite points in one face or in the crown of the nut. These projections are preferably rectangular in form and are of a height substantially greater than half of the pitch of the threads and need not be of a greater height than substantially twice the pitch, but, of course, may be of any height suitable to engage the retainer. The retainer consists of a tubular member 8 internally threaded and formed with recesses 9 corresponding with and adapted to receive the projections 7 of the nut so that the retainer may be superposed upon the nut with the projections of the latter engaging in the recesses of the retainer. In form, the retainer is slightly distorted from a true circular form by being flattened or compressed radially at one or more points in its circumference, preferably at two opposite points at angles of 90 degrees with the recesses 9.

Although the nut and its retainer are described as having two projections and recesses, it is obvious that any number of projections and recesses may be provided and they may be of any desired size or shape.

The nut and retainer may be applied to any threaded member, such, for example, as a bolt 10 having a threaded bolt shaft 11 and represented in the present exemplification of the invention as employed to hold two pieces of material 12 and 13 together. The nut and its retainer are assembled so that the projections of the nut engage with the recesses in the retainer and they are threaded together upon the shaft of the bolt.

The recesses of the retainer are so disposed with respect to the projections of the nut that the retainer will not engage with the threads of the bolt shaft when the face of the retainer is in close contact with the crown of the nut. In other words, in the preferred form the retainer will not engage the threads of the threaded shaft until after the nut has been slightly threaded upon the shaft, leaving a space 14 between the nut and the retainer, as shown in the drawing. This insures that the face of the retainer and the adjacent crown of the nut will not be in contact at any time so that the pressure upon the nut would be transmitted by bearing contact with the retainer to the latter. The only place of engagement between the nut and its retainer is on the surfaces of the projections 7, which contact with the faces of the recesses 9 and since the recesses are sufficiently deep to prevent the projections from engaging them at the bottom, the only point of contact will be between the lateral face of each projection and the corresponding side face of the recess. The distortion of the retainer is sufficient to firmly grip the threads of the bolt shaft 11, so that it is practically impossible for the nut to work loose even under severe vibration and even if the threads of a member to which the nut is to be attached are greatly worn, the distorted portions of the threads of the retainer are effective to grip the threads of the shaft member.

Fig. 4 illustrates a modification of the invention in which the nut is provided with recesses or slots 15 and the retainer with corresponding projections 16. The operation and results are the same as with the construction previously described and for some reasons this latter design might be preferred.

It is obvious that the retainer cannot be threaded upon the bolt shaft or removed therefrom without the movement of the nut itself, and although the threads of the retainer are distorted, it requires only a slightly greater effort to move the nut and the retainer upon the bolt shaft 11 than to move the nut alone for the reason that the pressure of a wrench or other moving device is directly applied to rotate the nut and the retainer, whereas the vibration which the nut may be subjected to will not cause the rotation of the retainer because of the grip which the threads of the retainer have upon the bolt shaft.

The advantages of this device, when compared with double nuts, check nuts, grip nuts, and the like, are apparent, first, for the reason that the holding member or nut is absolutely locked against rotation to its retaining member and does not impart any of its load or bearing strain to the latter; second, the application of the retainer does not add to the load or bearing strain as is the case in double nut practice; third, the retainer, unlike other frictional devices, clasps the threads in a normal manner and tends to form them rather than to destroy them; fourth, the improved retainer is not subject to the influence of vibration to the same extent that a nut is, as its ratio of weight to the thread area is much reduced, approximating only one-eighth that of a standard nut in all sizes. Also, on account of its resilient section, it is held in firm contact with its bolt at all times.

It is a well-known fact that the inertia of a nut on a threaded bolt, subjected to severe vibration, is the chief cause of its loosening on the threads and turning off, as it produces independent motion between the thread surfaces, causing them to wear, and the usual practice of tapping nuts "oversize" to make them free on the threads, tends to hasten this effect. This action is particularly apparent where the direction of vibration is vertical to the longitudinal axis of the bolt and rapidly increases in effect as the nut becomes looser on the bolt. It is, therefore, evident that as the ratio of the thread area to the weight is increased, this injurious action between the bolt and the nut under vibration will be reduced, and in an inverse ratio. This ratio in the devices cited is not subject to reduction nor can their walls be made resilient, for as their retaining members having no rotative connection with their holding members, they must both be provided with wrenching surfaces, and since there is no means for preventing a bearing contact, they must be of equal strength.

By designing the retainer tubular in section and not too heavy to possess the desired resilience, the threads may be distorted radially at one or more points in the circumference, thus forming a section that will bind with a spring-like action radially upon the threads of the bolt and will automatically compensate for the wear between the two threaded surfaces, due to vibration of the nut and to application and removal of the retainer. The distortion of the tubular portion extends throughout its length and may be increased as desired, for example, by a slight tap of a hammer or the like. The distortion or flattening is usually so slight that it is scarcely noticeable to the eye but is effective in operation to produce the desired result.

While I have thus described the preferred embodiment of my invention, it is evident that others may make various changes in the construction, combination, and arrangement of the several parts without departing from the spirit and scope of the invention.

What I claim is:

1. In combination a nut, a bolt, a retainer therefor threaded on the inside with an unbroken spiral thread and compressed to grip the threads of a member to which it is applied, said retainer and nut having their opposing faces separated, and connections between said retainer and nut which loosely engage each other.

2. In combination a nut, and a retainer, the nut and the retainer being provided with corresponding projections and recesses whereby the movement of the nut may effect the movement of the retainer, the threads of the retainer being so disposed that the face of the retainer and the adjacent crown of the nut are not in contact when the retainer is in position and when the projections are in engagement with the recesses.

3. In combination, a threaded bolt, a nut, and a retainer for the nut which consists of a threaded and distorted tubular member, the nut and the retainer being provided with means which prevent their interengagement in a direction longitudinal of the bolt shaft.

4. In combination, a nut, a bolt, and a separate retainer, the retainer being tubular in form and equally distorted throughout its entire length by compressing it at two opposite points in its circumference whereby the retainer threads are brought into locking engagement with the bolt threads and caused to bind on the latter, and means for preventing the nut from rotating on its threads into such a bearing contact as would transmit the strains of the bolt through the nut to the retainer.

5. As an article of manufacture a nut having parallel sides for adjustment and removal and being provided upon the crown of the nut with projections substantially greater in height than the thread pitch, and a tubular threaded retainer of resilient material less in thickness than the nut, having slots in the edges of one face of the retainer to receive the projections of the nut and being distorted by compression at two points diametrically opposite and at substantially 90 degrees from the slots, the threads of the retainer being so disposed that when the nut and the retainer are applied to a threaded member, the retainer will be spaced from the face of the nut and in engagement with the projections thereof, whereby the pressure on the nut will not be transmitted by bearing contact upon the adjacent face of the retainer.

In testimony whereof I have signed my name to this specification, in the presence of two subscribing witnesses, on this 3rd day of July, A. D. 1912.

EDWARD A. GREEN.

Witnesses:
KENT W. WONNELL,
CHARLES H. SEEM.